United States Patent
Chang

(10) Patent No.: US 9,779,704 B1
(45) Date of Patent: Oct. 3, 2017

(54) APPARATUS PROVIDING TEETH LOCATION GUIDE FOR USE WITH SINGLE-REED WOODWIND INSTRUMENTS

(71) Applicant: Shun-Hwa Chang, Fremont, CA (US)

(72) Inventor: Shun-Hwa Chang, Fremont, CA (US)

( * ) Notice: Subject to any disclaimer, the term of this patent is extended or adjusted under 35 U.S.C. 154(b) by 0 days.

(21) Appl. No.: 15/458,804

(22) Filed: Mar. 14, 2017

(51) Int. Cl.
  *G10D 9/02* (2006.01)
  *G10D 7/06* (2006.01)
  *G10D 7/08* (2006.01)

(52) U.S. Cl.
  CPC .......... *G10D 9/023* (2013.01); *G10D 7/066* (2013.01); *G10D 7/08* (2013.01); *G10D 9/02* (2013.01)

(58) Field of Classification Search
  CPC .......... G10D 9/023; G10D 9/02; G10D 7/066; G10D 7/08
  See application file for complete search history.

(56) References Cited

U.S. PATENT DOCUMENTS

| | | | | |
|---|---|---|---|---|
| 2,368,556 A * | 1/1945 | MacCaferri | .............. | G10D 9/02 84/383 R |
| 2,494,231 A * | 1/1950 | Dunn | ....................... | G10D 9/02 84/383 R |
| 5,476,026 A * | 12/1995 | McFarlin | ................. | G10D 9/02 84/383 R |
| 7,741,549 B2 * | 6/2010 | Espinosa Ferrando | .................... | G10D 7/005 84/383 A |
| 9,153,215 B2 * | 10/2015 | Morrison | ............... | G10D 9/023 |
| 2005/0072623 A1 * | 4/2005 | Rovner | .................... | G10D 9/02 181/21 |

* cited by examiner

*Primary Examiner* — Robert W Horn
(74) *Attorney, Agent, or Firm* — Roger H. Chu

(57) ABSTRACT

Apparatus for providing teeth position guide for single-reed woodwind music instruments are disclosed. The apparatus includes a mouthpiece patch containing top and bottom sides with at least two thickness layer formed therebetween. The bottom side is a flat surface having an adhesive means configured thereon. The top side is a split-level surface containing first and second levels having different thicknesses. A ledge is formed between the first level and the second level, whereby the ledge is configured as a position guide for upper incisor teeth of a player of woodwind instruments, when the mouthpiece patch is attached to a mouthpiece.

17 Claims, 8 Drawing Sheets

APPARATUS PROVIDING TEETH LOCATION GUIDE FOR USE WITH SINGLE-REED WOODWIND INSTRUMENTS

FIELD

The invention generally relates to musical instrument accessories and, more particularly, to an apparatus providing teeth position guide for use with single-reed woodwind instruments.

BACKGROUND

The mouthpiece of a single-reed woodwind instrument is a device upon which the vibrating reed element is normally mounted to a surface of the mouthpiece, so that the tapered, less-thick end of the reed, being very flexible, functions as a reed valve. In order to produce proper tones of a single-reed woodwind instrument, a player must master several techniques (referred to as embouchure). One of the techniques is to position the mouthpiece in a player's mouth. Often times, this has been very difficult to master especially for a novice player to learn because the depth of mouthpiece into the player's mouth cannot be easily controlled or detected. This problem leads many frustrations for both teachers and students of single-reed woodwind instruments. Therefore, it would be desirable to have an apparatus that can alleviate the aforementioned problem.

BRIEF SUMMARY

This section is for the purpose of summarizing some aspects of the invention and to briefly introduce some preferred embodiments. Simplifications or omissions in this section as well as in the abstract and the title herein may be made to avoid obscuring the purpose of the section. Such simplifications or omissions are not intended to limit the scope of the invention.

Apparatus for used with single-reed woodwind instruments to provide a position guide on a mouthpiece for upper incisor teeth of a player are disclosed. According to one example embodiment of the invention, the apparatus includes a mouthpiece patch containing top and bottom sides with at least two different thickness layer formed therebetween. The bottom side is a flat surface having an adhesive means configured thereon. The top side is a split-level surface containing first and second levels having different thicknesses. A ledge is formed between the first level and the second level, whereby the ledge is configured as a position guide for upper incisor teeth of a player of woodwind instruments, when the mouthpiece patch is attached to a mouthpiece.

Other objects, features, and advantages of the invention will become apparent upon examining the following detailed description of an embodiment thereof, taken in conjunction with the attached drawings.

BRIEF DESCRIPTION OF THE DRAWINGS

These and other features, aspects, and advantages of the invention will be better understood with regard to the following description, appended claims, and accompanying drawings as follows:

DETAILED DESCRIPTION

In the following description, numerous specific details are set forth in order to provide a thorough understanding of the invention. However, it will become obvious to those skilled in the art that the invention may be practiced without these specific details. The descriptions and representations herein are the common means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Used herein, the terms "top" and "bottom", "front" and "rear", "longitudinal" and "transverse" are intended to provide relative positions for the purposes of description, and are not intended to designate an absolute frame of reference.

Embodiments of the invention are discussed herein with reference to FIGS. 1-7B. However, those skilled in the art will readily understand and appreciate that the detailed descriptions given herein with respect to these figures is for explanatory purposes as the invention extends beyond these limited embodiments.

Figure 1:
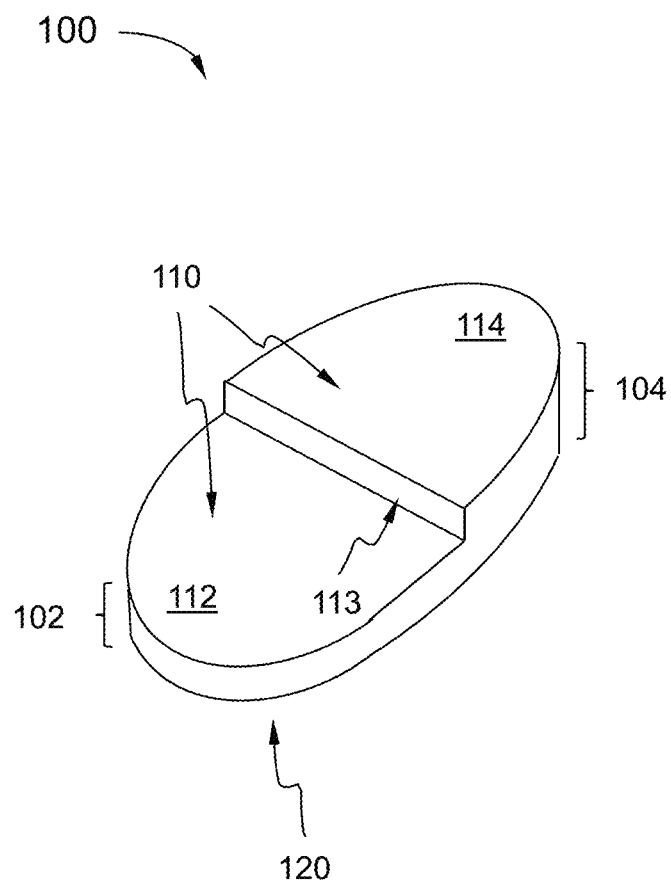
FIG. 1 is a perspective view depicting an example mouthpiece patch in accordance with one embodiment of the invention.

Referring first to FIG. 1, a perspective view of an example mouthpiece patch or mouthpiece pad 100 is shown. Mouthpiece patch 100 has at least two different thicknesses between the top side 110 and the bottom side 120. The bottom side 120 is a flat surface having an adhesive means configured thereon. The top side 110 is a split-level surface containing at least two levels (e.g., first level 112 and second level 114). The thickness of the first level 102 is thinner than that of the second level 104, thereby a ledge 113 is formed between the first level 112 and the second level 114. Ledge 113 is configured as a position guide for upper incisor teeth of a player of woodwind instruments, when the mouthpiece patch 100 is attached to a mouthpiece (e.g., beak 170 of a mouthpiece 180 shown in FIG. 4). Mouthpiece patch 100 may be made of single or multiple materials including, but not limited to, rubber, plastic, etc.

Figure 2A:
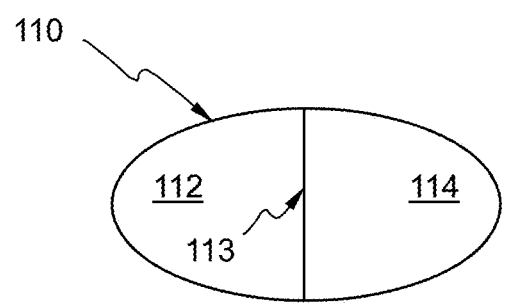
FIG. 2A is a plan view depicting the top side of the example mouthpiece patch of FIG. 1 in accordance with one embodiment of the invention.
Figure 2B:
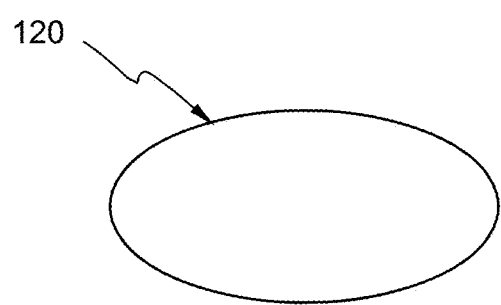
FIG. 2B is a perspective view depicting the bottom side of a example mouthpiece patch in accordance with one embodiment of the invention.
Figure 3A:
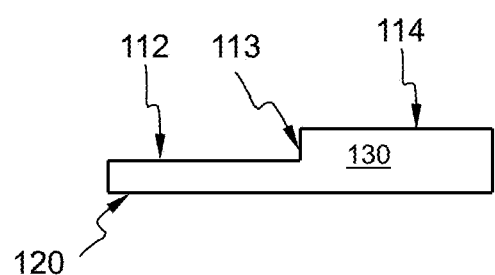
FIG. 3A is an elevation view depicting the profile of a first example mouthpiece patch in accordance with one embodiment of the invention.
Figure 3B:
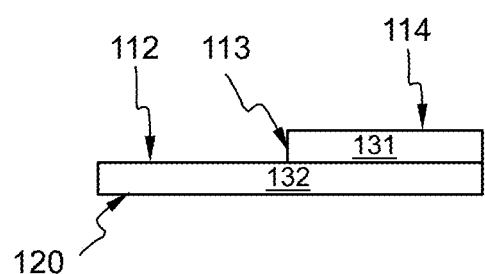
FIG. 3B is an elevation view depicting the profile of a second example mouthpiece patch in accordance with another embodiment of the invention.
Figure 4:
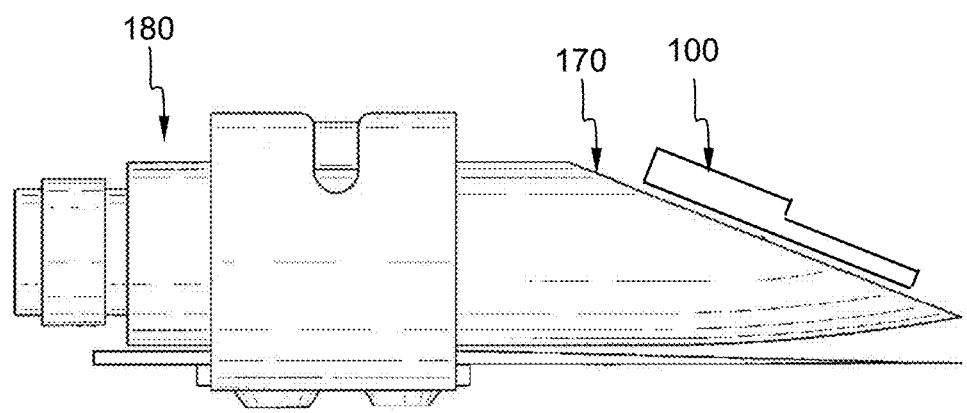
FIG. 4 is a side view showing an example mouthpiece with a mouthpiece patch in accordance with an embodiment of the invention.

A plan view of the top side 110 of the mouthpiece patch 100 is shown in FIG. 2A, while the plan view of the bottom side 120 is shown in FIG. 2B. FIG. 3A is an elevation view of the mouthpiece patch 100 formed with a single material 130. In an alternative embodiment, the mouthpiece patch 100 contains first and second uniform-thickness layers 131-132 affixed to each other as shown in FIG. 3B. The first layer 131 is smaller than the second layer 132. In one embodiment, the second layer 132 is a prior art mouthpiece patch. The first layer 131 is attached to the second layer 132 with certain well-known attach means (e.g., glue).

Figure 5A:
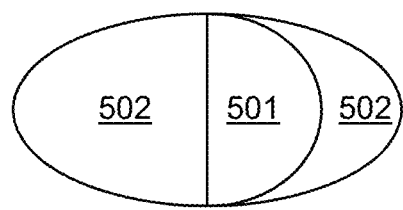
FIGS. 5A-5G are diagrams showing other example mouthpiece patches having more than two levels on the top side in accordance with an embodiment of the invention.
Figure 5B:
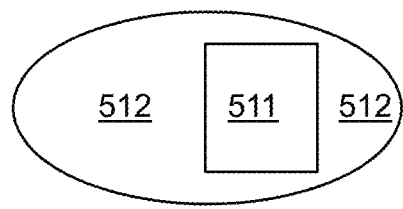
Figure 5C:
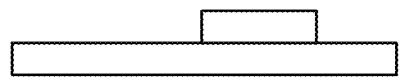

FIGS. 5A-5C show other example mouthpiece patches having more than two levels on the top side according to one embodiment of the invention. FIG. 5A shows the top side containing three levels formed by two uniform-thickness layers: the first layer 501 has a semi-circular shape and the second layer 502 has a geometric shape (e.g., an oval shape in a prior art mouthpiece patch). FIG. 5B shows the top side containing three levels formed by a rectangular shape first layer 511 and an oval shape second layer 512. An elevation view shown in FIG. 5C is an example profile of the mouthpiece patches shown in FIGS. 5A-5B.

Figure 5D:
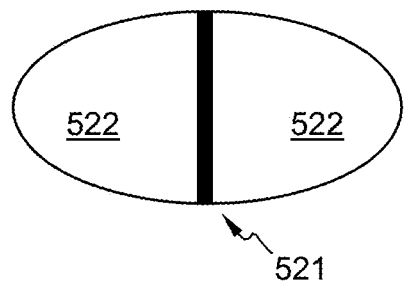
Figure 5E:
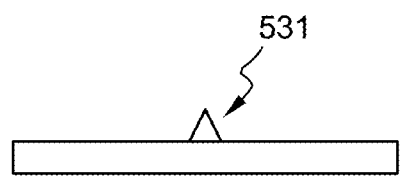
Figure 5F:
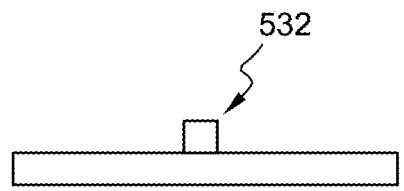
Figure 5G:
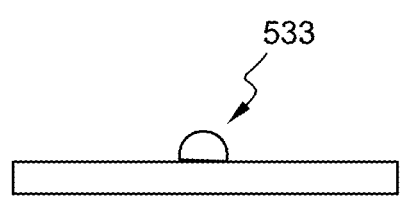

FIG. 5D shows another example mouthpiece patch having a rib 521 configured on the top side 522. The rib 521 is configured horizontally across the top side 522 and can be used as a location guide for the teeth of a player. FIG. 5E shows a first example rib 531 having a triangular cross-section. A second example rib 532 shown in FIG. 5F has a quadrilateral cross-section. FIG. 5G shows a third example rib 533 having a semi-circular cross-section. The invention sets no limit as to what type of geometric shapes to be used as a cross-section of a rib 521.

Figure 6:
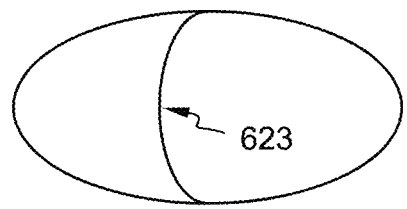
FIG. 6 shows other alternative example ledges on a mouthpiece patch in accordance with an embodiment of the invention.
Figure 6:
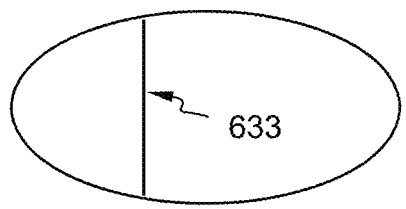
Figure 6:
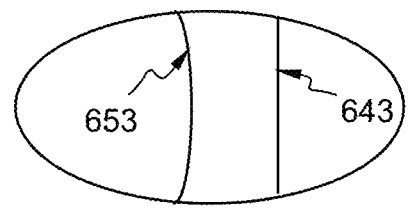

FIG. 6 shows other alternative example ledges on a mouthpiece patch in accordance with an embodiment of the invention. A first curved ledge 623 located at substantially middle of the top side. A first straight ledge 633 located substantially off the middle of the top side. A curved ledge 653 and a straight ledge 643 are both formed on the top side.

Figure 7A:
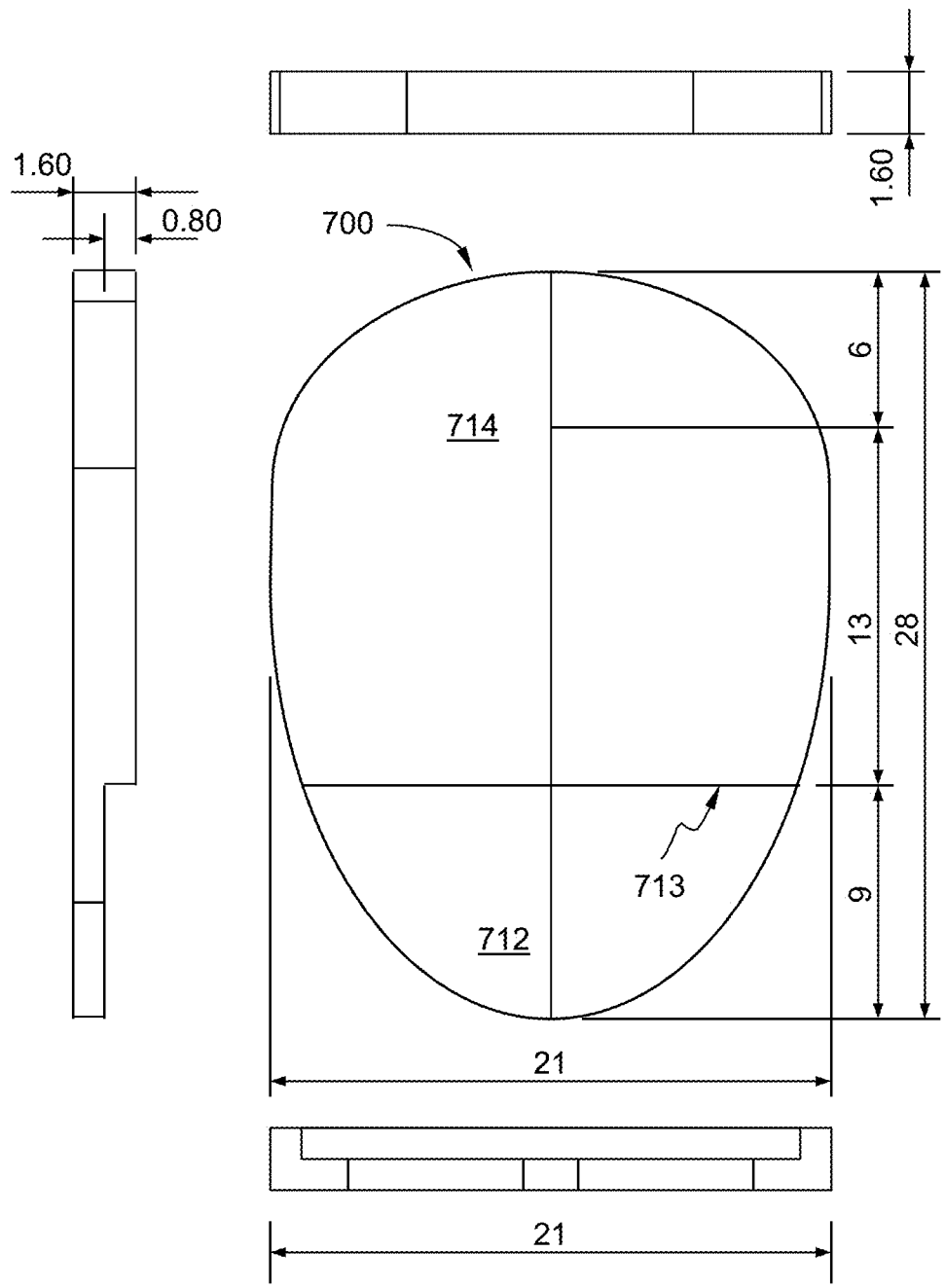
FIG. 7A is a diagram illustrating various two dimensional views of an example teardrop shape mouthpiece pad in accordance with one embodiment of the invention.
Figure 7B:
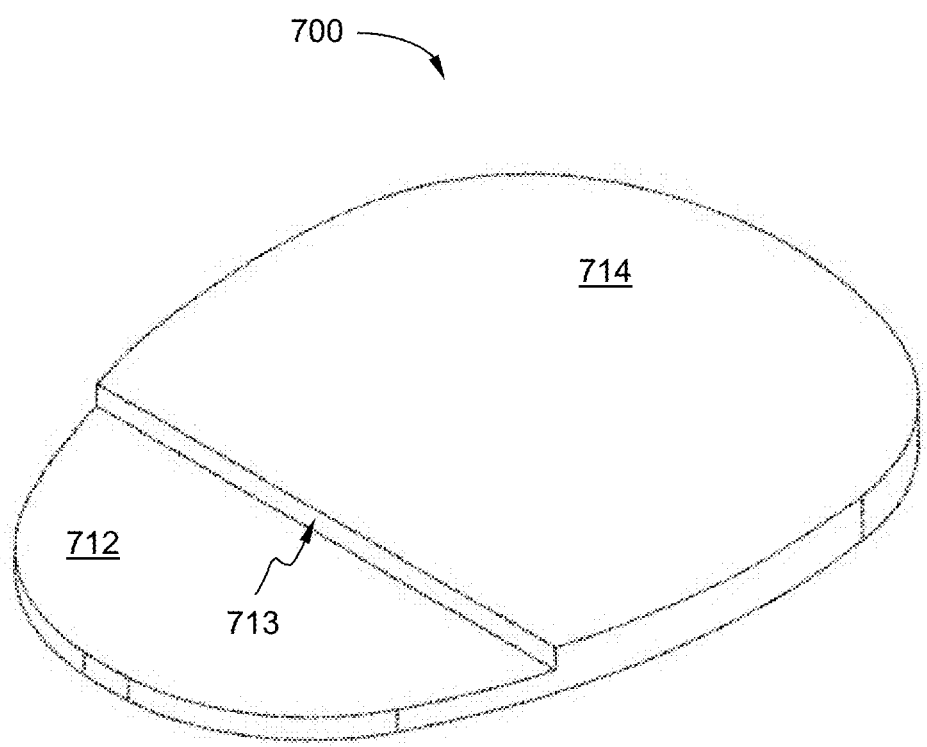
FIG. 7B is a perspective view of the example teardrop shape mouthpiece pad of FIG. 7A.

In an alternative embodiment, various two dimensional views of an example teardrop shape mouthpiece pad 700 are shown in FIG. 7A. Ledge 713 is formed between the first level 712 and the second level 714. A perspective view of the example teardrop shape mouthpiece pad 700. All dimensions shown in FIG. 7A are in millimeters as an example. Other dimensions can be used in another embodiment.

Although the invention has been described with reference to specific embodiments thereof, these embodiments are merely illustrative, and not restrictive of, the invention. Various modifications or changes to the specifically disclosed exemplary embodiments will be suggested to persons skilled in the art. For example, whereas the shape of mouthpiece patch has been described and shown as oval shape, other geometric shapes can be used to achieve the same, for example, a quadrilateral shape. In summary, the scope of the invention should not be restricted to the specific exemplary embodiments disclosed herein, and all modifications that are readily suggested to those of ordinary skill in the art should be included within the spirit and purview of this application and scope of the appended claims.

I claim:

1. An apparatus for providing teeth position guide for single-reed woodwind music instruments comprising:
   a mouthpiece patch having top and bottom sides with at least two different thickness layer formed therebetween;
   the bottom side being a flat surface having an adhesive means configured thereon;
   the top side being a split-level surface containing first and second levels having different thicknesses;
   a ledge being formed between the first level and the second level;
   whereby the ledge is configured as a position guide for upper incisor teeth of a player of woodwind instruments, when the mouthpiece patch is attached to a mouthpiece.

2. The apparatus of claim 1, wherein the ledge comprises a straight edge.

3. The apparatus of claim 1, wherein the ledge comprises a curved edge.

4. The apparatus of claim 1, wherein the thickness of the first level is thinner than that of the second level.

5. The apparatus of claim 1, wherein the mouthpiece patch has a geometric shape for the top side and the bottom side.

6. The apparatus of claim 1, wherein the geometric shape comprises an oval shape.

7. The apparatus of claim 1, wherein the geometric shape comprises a circular shape.

8. The apparatus of claim 1, wherein the geometric shape comprises an elliptical shape.

9. The apparatus of claim 1, wherein the geometric shape comprises a teardrop shape.

10. The apparatus of claim 1, wherein the mouthpiece patch is formed with a single piece of material.

11. The apparatus of claim 1, wherein the mouthpiece patch is formed with first and second uniform-thickness layers affixed to each other.

12. The apparatus of claim 11, wherein the first uniform-thickness layer is smaller than the second uniform-thickness layer.

13. The apparatus of claim 11, wherein the second uniform-thickness layer comprises a prior art mouthpiece patch.

14. The apparatus of claim 1, further includes a second ledge formed between the second level and a third level on the top side.

15. An apparatus for providing teeth position guide for single-reed woodwind music instruments comprising:
   a mouthpiece patch having a top side and a bottom side;
   the bottom side being a flat surface having an adhesive means configured thereon; and
   a rib being configured horizontally across the top side as at least one ledge;
   whereby the ledge is configured as a position guide for upper incisor teeth of a player of woodwind instruments, when the mouthpiece patch is attached to a mouthpiece.

16. The apparatus of claim 15, wherein the rib comprises a thin strip of material.

17. The apparatus of claim 15, wherein the rib has a geometric shape cross-section.

* * * * *